US007181418B1

(12) United States Patent
Zucker et al.

(10) Patent No.: US 7,181,418 B1
(45) Date of Patent: Feb. 20, 2007

(54) INTERNET CUSTOMER SERVICE METHOD AND SYSTEM

(76) Inventors: John Todd Zucker, 38 Carson Rd., Billercay Essex CM11 1SA (GB); Paul Cleaves, 2 Mead Park, Holmer Green, High Wycombe, Buckinghamshire, GB HP15 6UL (GB); William Murrell, 5 Tracy Avenue, London, NW2 4AT (GB); Colin Ashurst, Thames Valley Park, Reading (GB) RG6 1WG; Heikki Ahdekivi, Armas Lindgrenin tie 9 A 1, Helenski 00570 (FI); John Hitcham, Creeksea Lodge, Creeksea Lane, Burnham-on-Crouch, Essex CM0 8PH (GB); Jussi Jarrett, Vaaralankulma 4A, Vantaa 01230 (FI); Jussi Tolvanen, Vassanpuisitikko 2 D83, Vaasa 65100 (FI); Paula Brooks, 62 Upland Road, Billericay Essex, CM12 OJS (GB); Rachel Cartwright, 50 St. Leonards Avenue, Windsor, Berkshire SL4 1HX (GB); Soren Bradbury, St. John's Cottage, Church Lane, Little Leights, CM3 1PQ (GB); Tim Burdett, 70, Lampem Crescent, Billericay Essex CM12 OFD (GB)

( * ) Notice: Subject to any disclaimer, the term of this patent is extended or adjusted under 35 U.S.C. 154(b) by 636 days.

(21) Appl. No.: 09/569,929

(22) Filed: May 13, 2000

Related U.S. Application Data

(60) Provisional application No. 60/168,030, filed on Nov. 30, 1999.

(51) Int. Cl.
*G06Q 30/00* (2006.01)
(52) U.S. Cl. .............................. 705/26; 705/27; 705/28; 705/37; 705/38
(58) Field of Classification Search .................... 705/8, 705/9, 26, 27, 37, 38, 28, 29, 39
See application file for complete search history.

(56) References Cited

U.S. PATENT DOCUMENTS 4,799,156 A * 1/1989 Shavit et al. .................. 705/26

(Continued)

FOREIGN PATENT DOCUMENTS

JP 10031705 A * 2/1998

OTHER PUBLICATIONS http://www.ford.com/default.asp? Buyer Connection Build a new vehicle.

(Continued)

*Primary Examiner*—Alexander Kalinowski
*Assistant Examiner*—M. Thein
(74) *Attorney, Agent, or Firm*—Brooks Kushman P.C.; Gary A. Smith

(57) ABSTRACT

An Internet customer service system (10) includes a product database (22) storing product data (24,26,28,30) associated with products available to a customer. The system (10) also includes an interface agent database (68) storing available interface agents (80) for interacting with the customer. The system (10) also includes a server (16) operable to access the product database (22) and display the product data (24,26, 28,30) to the customer through interface web pages (18). The server (16) is further operable to access the interface agent database (68) and display the available interface agents (80) to the customer through the web pages (18). The system further includes a customer database (34) storing customer data (36) generated in response to displaying one or more profile screens (44) to the customer via the web pages (18). The customer database (34) also stores configured product data (54) generated in response to receiving selected product data (24,26,28,30) from the customer via the web pages (18). The server (16) is operable to transmit, in response to receiving a selected interface agent (80) and an appointment schedule from the customer, the customer data (36), the configured product data (54), and the appointment schedule to the selected interface agent (80).

40 Claims, 9 Drawing Sheets

U.S. PATENT DOCUMENTS

| | | | |
|---|---|---|---|
| 5,757,917 A | 5/1998 | Rose et al. | |
| 5,765,139 A | 6/1998 | Bondy | |
| 5,774,873 A | 6/1998 | Berent et al. | |
| 5,774,883 A * | 6/1998 | Andersen et al. | 705/38 |
| 5,802,497 A | 9/1998 | Manasse | |
| 5,809,479 A | 9/1998 | Martin et al. | |
| 5,826,241 A | 10/1998 | Stein et al. | |
| 5,839,112 A | 11/1998 | Schreitmueller | |
| 5,884,300 A | 3/1999 | Brockman | |
| 5,887,271 A | 3/1999 | Powell | |
| 5,890,137 A | 3/1999 | Koreeda | |
| 5,895,454 A | 4/1999 | Harrington | |
| 5,897,622 A | 4/1999 | Blinn et al. | |
| 5,899,980 A | 5/1999 | Wilf et al. | |
| 5,913,210 A | 6/1999 | Call | |
| 5,950,173 A | 9/1999 | Perkowski | |
| 5,960,408 A | 9/1999 | Martin et al. | |
| 5,960,411 A | 9/1999 | Hartman et al. | |
| 5,983,199 A | 11/1999 | Kaneko | |
| 5,983,200 A * | 11/1999 | Slotznick | 705/26 |
| 5,991,739 A | 11/1999 | Cupps et al. | |
| 6,009,413 A | 12/1999 | Webber et al. | |
| 6,014,628 A | 1/2000 | Kovarik, Jr. | |
| 6,016,504 A | 1/2000 | Arnold et al. | |
| 6,085,170 A * | 7/2000 | Tsukuda | 705/26 |
| 6,108,639 A * | 8/2000 | Walker et al. | 705/26 |
| 6,112,190 A * | 8/2000 | Fletcher et al. | 705/38 |
| 6,205,436 B1 * | 3/2001 | Rosen | 705/65 |
| 6,282,517 B1 * | 8/2001 | Wolfe et al. | 705/26 |
| 6,323,894 B1 * | 11/2001 | Katz | 348/14.08 |
| 6,378,075 B1 * | 4/2002 | Goldstein et al. | 713/200 |
| 6,401,080 B1 * | 6/2002 | Bigus et al. | 705/37 |

OTHER PUBLICATIONS http://www.gateway.com/home/index.shtml How to by a scanner.

Wysiwyg://45/http://www.gmbuyerpower...yPower.applications. Session.Driver The Future of Online Auto Buying.

http://www.autobytel.com/content/buy/NewIndex.cfm?id=abt New Car Purchase Center.

http://carpoint.msn.com/newcar/default.asp?src=Home New Car buying service.

* cited by examiner

INTERNET CUSTOMER SERVICE METHOD AND SYSTEM

CROSS-REFERENCE TO RELATED APPLICATION

This application claims the benefit of U.S. provisional Appl. No. 60/168,030, filed Nov. 30, 1999.

TECHNICAL FIELD OF THE INVENTION

This invention relates in general to the field of computer systems and the Internet and, more particularly, to an Internet customer service method and system.

BACKGROUND OF THE INVENTION

Online shopping is quickly becoming the preferred means for obtaining consumer products and services. More consumers, for example, are now using the Internet to browse, comparison shop, and order products online. Online shopping systems have made product information, including pricing and availability, readily available to consumers and have facilitated the location and purchasing of desired products at lower costs and with added convenience.

Accordingly, many retailers have established "electronic store fronts" to offer all kinds of products and services ranging from clothes and groceries to computers and automobiles. Conventional electronic store fronts, however, are often modeled after traditional catalogs and are limited in the information disseminated and services provided to the consumer. With typical electronic store fronts, for example, a consumer is prompted to search for a desired product by entering one or more keywords or by sequentially selecting displayed product groups to narrow the product search until the desired product is located. A search result of relevant items is then displayed to the consumer along with a product description and price. The consumer may then place a desired product in an "electronic shopping cart" which the customer uses to place an order with the online merchant.

A shortcoming of conventional systems, however, is that further customer and retailer interaction may be required to complete a purchasing transaction. For example, the customer may choose to inspect or evaluate a product prior to purchasing the product. Additionally, the customer may desire to provide a product to the retailer for inspection and valuation to offset a purchase price of a new product, such as a trade-in vehicle value used to reduce the price of a new vehicle. Although the customer may have the opportunity to contact a customer service representative via telephone or electronic mail, the customer services generally available to the customer may be inadequate to meet a particular customer's needs for completing a transaction.

SUMMARY OF THE INVENTION

In accordance with the present invention, the disadvantages and problems associated with prior systems and methods for Internet customer service have been substantially reduced or eliminated.

In accordance with one embodiment of the present invention, a method for product evaluation and tracking includes storing data associated with the customer in a database and displaying available product options to the customer for a desired product. In response to receiving the customer selected product and product options, the method also includes storing data associated with the desired product in a product database. The method also includes displaying available interface agents for customer evaluation of the desired product. In response to receiving a selected interface agent, the method also includes displaying an appointment schedule screen to the customer for selecting an appointment schedule to evaluate the desired product. In response to receiving a selected appointment schedule, the method further includes transmitting the desired product data, the customer data, and the selected appointment schedule to the selected interface agent.

In accordance with another embodiment of the present invention, a method for product valuation processing includes storing data associated with the customer in a database and displaying a valuation screen to the customer containing entry fields for receiving product data from the customer. In response to receiving the product data from the customer, the method also includes displaying available interface agents for valuation the product based on the product data. In response to receiving a selected interface agent, the method also includes displaying an appointment schedule screen to the customer for selecting an appointment schedule to valuate the product. In response to receiving a selected appointment schedule, the method further includes transmitting the customer data, the product data, and the selected appointment schedule to the selected interface agent for valuating the product.

Important technical advantages of the present invention include a system and method for Internet purchasing that provides enhanced customer services while providing online convenience and efficiency. This is accomplished through online data collection from the consumer and transmitting the customer data to a customer selected interface agent. The collected data may also be transmitted to a monitoring agent for monitoring and tracking the progress of the transaction and providing additional assistance to the customer and/or the selected interface agent for completing the transaction.

The selected interface agent provides local interaction with the customer for any customer requested services, such as providing the desired product for evaluation by the customer and/or valuating a customer provided product. The selected interface agent may also gather additional information associated with the requested services and transmit this information to the monitoring agent. Thus, the present invention provides both online and offline services to the customer for a convenient and efficient transaction.

Other technical advantages will be readily apparent to one skilled in the art from the following figures, descriptions and claims.

BRIEF DESCRIPTION OF THE DRAWINGS

For a more complete understanding of the present invention and the advantages thereof, reference is now made to the following descriptions taken in connection with the accompanying drawings, in which.

DETAILED DESCRIPTION OF THE INVENTION

Figure 1:
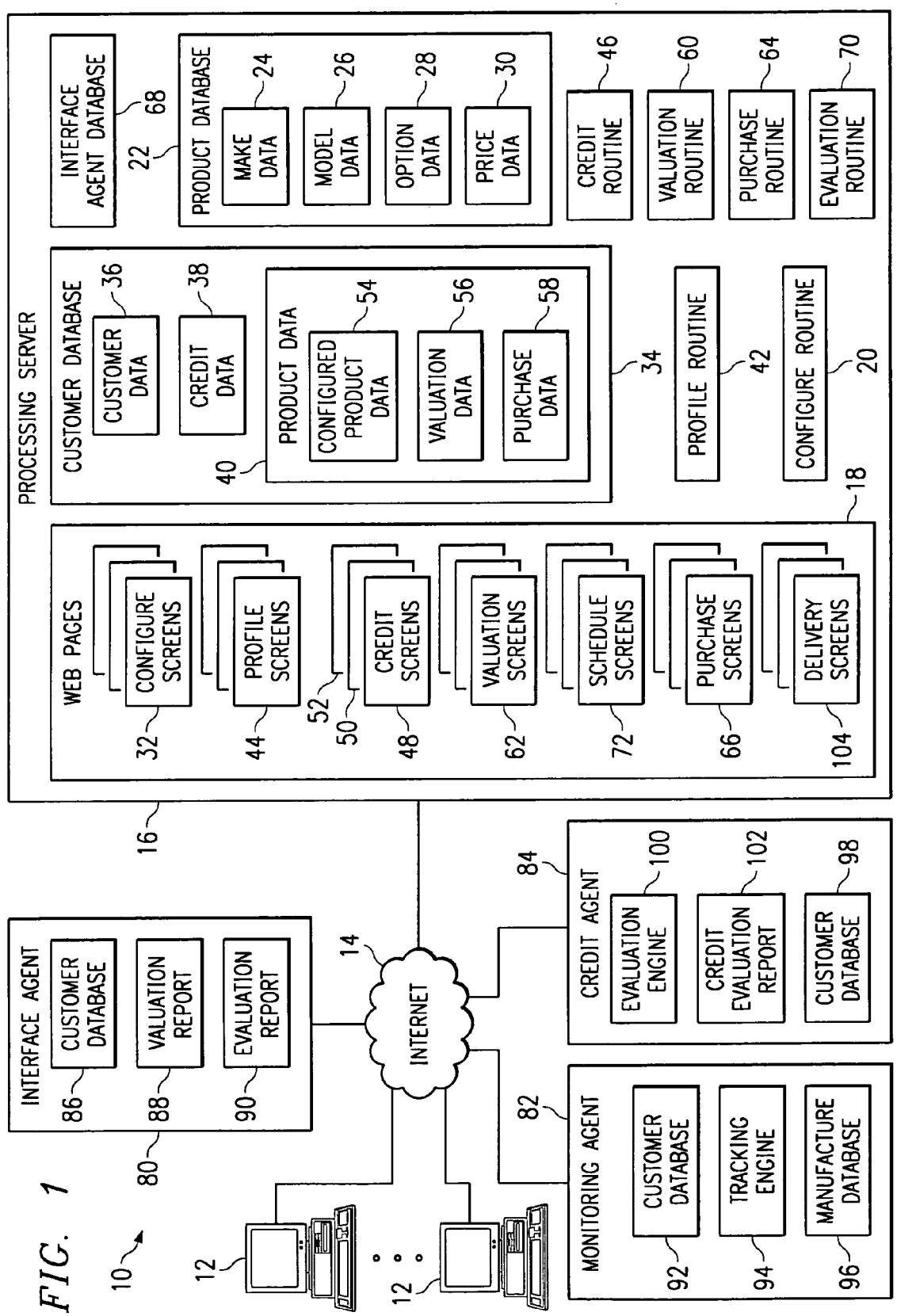
FIG. 1 is a diagram illustrating a system for online product purchasing processing constructed in accordance with an embodiment of the present invention.
Figure 2A:
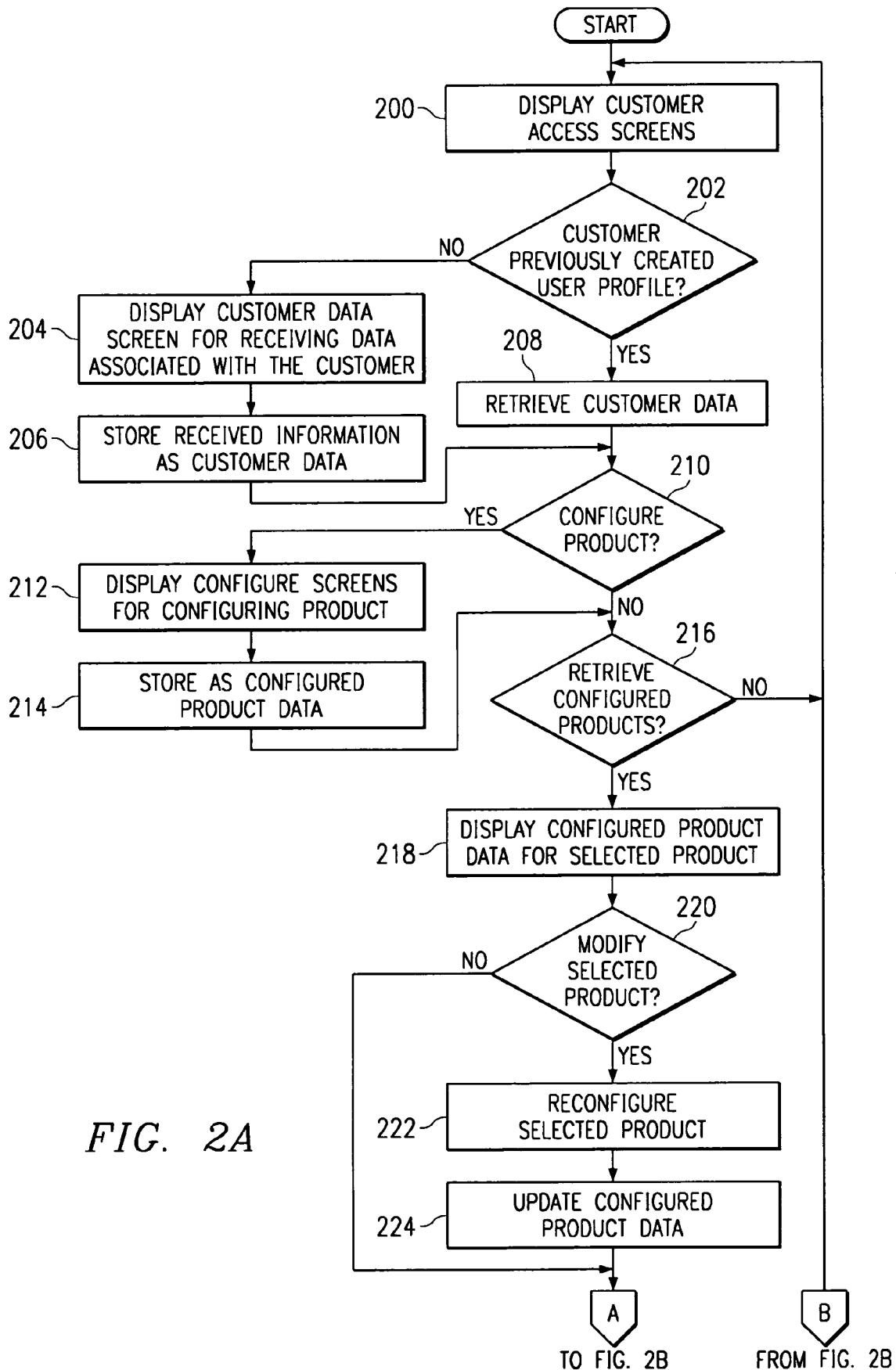
FIG. 2 is a flow chart of a method for product ordering and tracking according to an embodiment of the present invention.
Figure 2B:
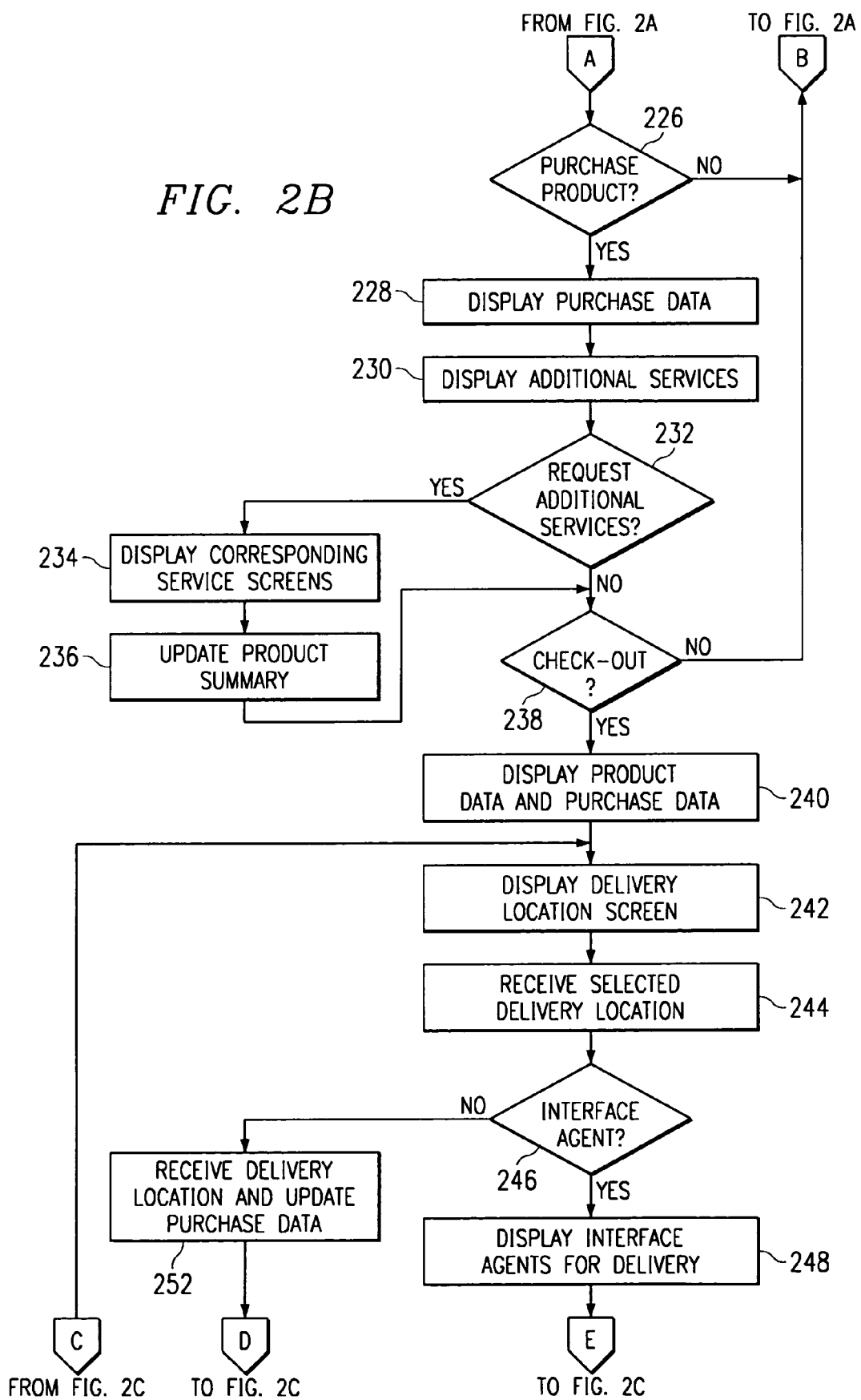
Figure 2C:
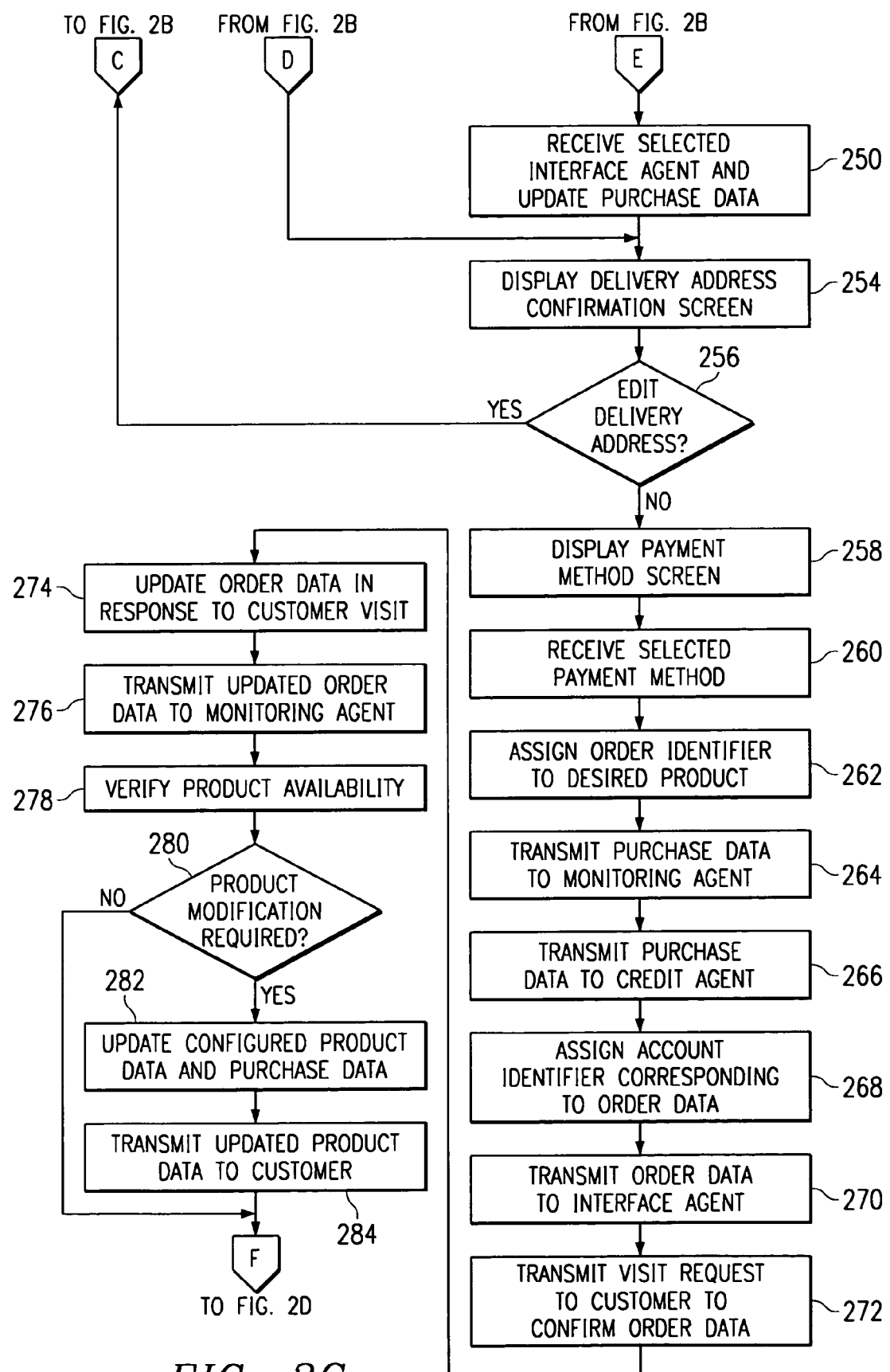
Figure 2D:
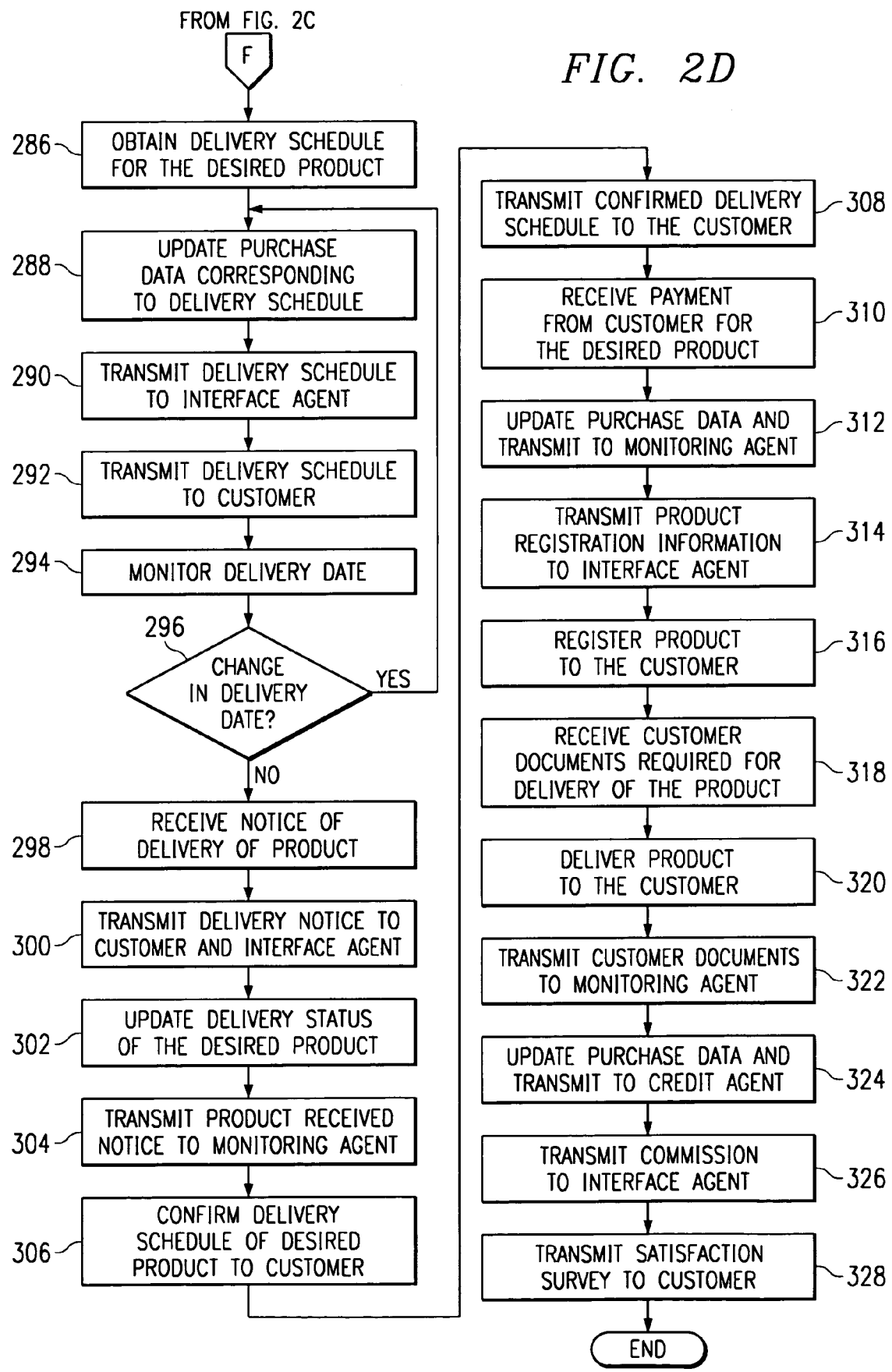

FIG. 1 illustrates a system 10 for product purchasing processing in accordance with an embodiment of the present invention. System 10 includes consumer or customer user interfaces 12 for communicating via a communication network 14 to a processing server 16. A "consumer" or "customer" can be any purchaser or user of a product offered for sale by an enterprise through a retailer, dealer, and/or manufacturer of a product. User interfaces 12 may be any suitable graphical interface for use with communication network 14. Communication network 14 may be different networks, or the same network, and may include any Internet, intranet, extranet, or similar communication network.

Processing server 16 is preferably embodied as one or more computer programs running on a suitable processor or processors. Customers may use a web browser application running on user interface 12 to display data contained in files commonly called web pages 20. The customer may display the data contained on web pages 20 and/or enter data onto entry fields contained on web pages 20.

As further illustrated in FIG. 1, processing server 16 also includes a configure routine 20 for configuring a product desired by the customer. For example, processing server 16 may include a product database 22 containing information associated with various products offered for sale to customers by an enterprise. For example, in an automotive application, product database 22 may include make data 24, model data 26, option data 28, and price data 30. Make data 24 and model data 26 may include information associated with various makes and models of automobiles offered for sale by an enterprise. Option data 28 may contain information associated with various options or option packages that are available for each make and model of automobile offered by the enterprise. Price data 30 may contain information associated with the cost of each make and model of the offered automobile and the cost of any options or option packages that may be combined with a particular automobile. However, product database 22 may contain other types of information associated with particular products offered by an enterprise.

In operation, configure routine 20 may be used to display one or more configure screens 32 to the customer so that the customer may configure a desired product. For example, a first configure screen 32 may display information contained in product database 22 such as make data 24 and model data 26 for selecting a particular make and model of automobile desired by the customer. The first configure screen may also contain price data 30 corresponding to the selected make and model of automobile. A next configure screen 32 may contain option data 28 for the various options available for the selected make and model and price data 30 corresponding to the selected options. For example, upon selection of a particular make and model of an automobile by the customer, price data 30 may be displayed corresponding to a baseline or preconfigured automobile for the customer selected make and model of automobile. As various options and/or option packages are selected or removed by the customer, price data 30 may be automatically adjusted based on the selected or removed options. However, product database 22 may be otherwise configured and displayed to the customer during product configuration.

Processing server 16 also includes a customer database 34 for receiving and storing data associated with a particular customer. In the embodiment illustrated in FIG. 1 customer database 34 includes customer data 36, credit data 38, and product data 40. Customer data 36 may include personal identification information associated with a particular customer such as name, address, phone number, electronic mail address, and other suitable personal information that may be used to identify and/or contact a particular customer. For example, processing server 16 may include a profile routine 42 for displaying one or more profile screens 44 to the customer for receiving personal information from the customer and storing the personal information as customer data 36. Profile screens 44 may include entry fields for receiving customer input of the various information; however, profile screens 44 may be otherwise configured for receiving information associated with a customer.

Credit data 38 may include information associated with a particular customer that may be used for performing a credit evaluation of the customer, such as for determining financing rates and terms for the purchase of a new product. Processing server 16 may include a credit routine 46 for displaying one or more credit screens 48 to the customer for receiving the requested information and storing the information as credit data 38. For example, a first credit screen 48 may comprise a credit inquiry screen 50 displaying one or more initial credit inquiries to the customer. The credit inquiries contained on credit inquiry screen 50 may be used to make an initial credit-worthy determination of the customer based on the customer responses to the credit inquiries. Credit inquiry screen 50 may include entry fields for receiving the requested credit inquiry responses; however, credit inquiry screen 50 may be otherwise configured for performing an initial credit determination of the customer. The responses received in response to credit inquiry screen 50 may be stored as credit data 38.

If the responses to credit inquiry screens 50 meet or exceed predetermined credit inquiry thresholds or standards, credit routine 46 may display one or more credit application screens 52 for receiving additional information from the customer associated with performing a more extensive credit evaluation of the customer. For example, credit application screens 52 may contain entry fields for receiving additional information from the customer similar to information requested for a general credit application, such as assets and liabilities of the customer, credit reference names and addresses, and any other suitable information associated with credit evaluation. The information received in response to the credit application screens 52 may also be stored as credit data 38.

Product data 40 may include configured product data 54, valuation data 56, and purchase data 58. Configured product data 54 may include information associated with a product configured by the customer using configure routine 20 and configure screens 32. For example, using configure routines 20, the customer may configure a product, such as a automobile, using information contained in product database 22 that is displayed on one or more configure screens 32. The data associated with the configured product may be stored as configured product data 54 so that configured products may be retrieved by the customer at a later date. For example, in the case of an automobile, each customer may be assigned a "garage" containing one of more configured vehicles that the customer may be considering whether to purchase. The customer may access the "garage" to review summaries of the configured products, modify the configured product and/or delete configured products. Configured product data 54 may also include price data 30 associated with each configured product.

Valuation data 56 may include information associated with a product owned or supplied by a customer that may be used to offset a purchase price of a new configured product. For example, in the case of an automobile purchase, valuation data 56 may include information associated with a vehicle owned or supplied by the customer that may be used as a trade-in to offset the purchase price of a new vehicle. In operation, processing server 16 may include a valuation routine 60 for displaying one or more valuation screens 62 to the customer. Valuation screens 62 may contain entry fields for receiving information associated with the customer's product. For example, valuation screens 62 may contain entry fields for receiving information associated with a customer provided product, such as information associated with a trade-in vehicle that the customer may desire to use to offset the purchase price of a new vehicle. However, valuation screens 62 may be otherwise configured for receiving information associated with a product provided by the customer. The information received in response to valuation screens 62 may be stored as valuation data 56.

Purchase data 58 may contain information associated with the purchase of a desired product by the customer. For example, processing server 16 may include purchase routine 64 for combining information associated with the purchase of a desired product. Purchase routine 64 may access and retrieve information such as configured product data 54, valuation data 56, and price data 30 for determining the final cost of the desired product. For example, purchase routine 64 may be used to display one or more purchase screens 56 for receiving information from the customer associated with purchasing the desired configured product. Purchase screens 66 may contain entry fields for receiving information from the customer associated with purchasing the desired product, such as financing terms obtained by the customer, any down payment that may be supplied by the customer, and any other suitable information associated with the purchase of the desired product. The information received and/or displayed on purchase screens 66 may be stored by purchase routine 64 as purchase data 58.

Processing server 16 may also include an interface agent database 68 containing information associated with interface agents available for providing additional services requested by the customer. For example, the interface agents may include local retailers, dealers, product providers, or other agents acting on behalf of an enterprise for interacting with the customer on an offline or more personal basis, such as for providing face-to-face interaction with the customer. Based on customer data 36 provided by the customer, information contained in interface agent database 68 may be displayed to the customer for selecting an interface agent to provide the additional services requested by the customer.

Processing server 16 may also include an evaluation routine 70 for providing the customer with evaluation services associated with a desired product. For example, the customer may desire to evaluate, inspect, or, in the case of an automobile, test drive, a desired product or a product similar to a configured product prior to purchasing the product. Evaluation routine 70 may be used to access customer data 36 and interface agent database 68 for displaying the available interface agents to the customer for providing the requested evaluation services. However, other suitable methods may be used for selecting available interface agents to interact with the customer.

Evaluation routine 70 may also be used to display one or more appointment schedule screens 72 for selection of an appointment schedule by the customer to interact with the selected interface agent. For example, appointment schedule screens 72 may contain entry fields for selecting one or more appointment schedules for interacting with the selected interface agent. The appointment schedule screens 72 may be used to select an appointment schedule for customer evaluation of a product or for having a customer provided product valuated by the interface agent. However, appointment schedule screens 72 may be otherwise configured for selecting an appointment schedule by the customer for receiving various interaction services with an interface agent.

In operation, information received from the customer is transmitted to a corresponding interface agent 80, monitoring agent 82 and/or credit agent 84 for providing services to the customer. For example, information may be transmitted between processing server 16, interface agents 80, monitoring agent 82 and credit agent 84 using communication network 14; however, other suitable communication methods and devices may also be used for transmitting information between processing server 16, interface agents 80, monitoring agent 82 and credit agent 84.

For example, as described above, interface agent database 68 may be accessed to retrieve available interface agents 80 for providing various interaction services to the customer. In response to selecting one or more interface agents 80, corresponding information may be transmitted to the selected interface agents 80 for providing the requested services. For example, a customer may request to evaluate a desired product offered by the enterprise and select a particular interface agent 80 and a corresponding appointment schedule to inspect and evaluate the desired product. Customer data 36, configured product data 54, and the selected appointment schedule may be transmitted to the selected interface agent 80 so that the selected interface agent 80 may provide the requested services.

As illustrated in FIG. 1, each interface agent 80 also includes a customer database 86 for storing information associated with a particular customer for providing the customer requested services. Although illustrated in abbreviated detail, customer database 86 may include information such as customer data 36, credit data 38 and product data 40 as required to provide the customer requested services. Information contained in customer database 86 may be transmitted to the selected interface agent 80 via communication network 14 or other suitable communication avenues.

Interface agent 80 may also generate a valuation report 88 and an evaluation report 90 in response to providing the customer requested services. For example, the customer may request valuation services and provide a product to the selected interface agent 80 for valuation, such as providing a trade-in vehicle to the interface agent 80 for assessing a value to the trade-in vehicle that may be used by the customer to offset the purchase price of the desired product. The interface agent 80 may inspect or otherwise evaluate the customer provided product and generate valuation report 88 containing information associated with the customer provided product. Interface agent 80 may also update valuation data 56 using information contained in valuation report 88.

Evaluation report 90 may be generated by interface agent 80 based on information received from the customer in response to a customer evaluation of a desired product. For example, the customer may request evaluation services corresponding to a desired product so that the customer may inspect and/or otherwise evaluate the desired product prior to purchasing the desired product. The interface agent 80 may record information received from the customer associated with the customer evaluation and generate evaluation report 90. Evaluation report 90 may be used to further modify the desired product to conform to particular customer requests, provide additional services requested by the customer, or may be used for other suitable purposes. Interface agent 80 may also update information contained in customer database 34 using information contained in evaluation report 90. For example, configured product data 54 may be updated by interface agent 80 to correspond with customer requested modifications to the desired product in response to customer evaluation of the product.

Monitoring agent 82 also includes a customer database 92 for storing information associated with a customer and any corresponding services requested by the customer. For example, although illustrated in abbreviated form, customer database 92 may contain information such as customer data 36, configured product data 54, any interface agent 80 selected by the customer, any appointment schedules selected by the customer, credit data 38, valuation data 56 and purchase data 58. Information contained in customer database 92 may be transmitted to monitoring agent 82 over communication network 14 or other suitable communication avenues.

Monitoring agent 82 also includes a tracking engine 94 for monitoring production and/or delivery of a desired product. For example, monitoring agent 82 may include a manufacture database 96 containing information associated with products currently being manufactured and/or ordered products for future manufacture. Tracking engine 94 may access manufacture database 96 to monitor and track the progress of an ordered product through the manufacture phase for notifying the customer and/or the selected interface agent 80 of an estimated delivery date of the desired product. Monitoring agent 82 may transmit the tracking information to the selected interface agent 80 and/or the customer over communication network 14 or other suitable communication avenues.

Credit agent 84 also includes a customer database 98 for storing information associated with a customer and any corresponding services requested by the customer. For example, although illustrated in abbreviated form, customer database 98 may contain information such as customer data 36, credit data 38, and product data 40 that may be used by credit agent 84 to perform a credit evaluation for the customer. The information contain in customer database 98 may be transmitted to credit agent 84 using communication network 14 or other suitable communication avenues.

Credit agent 84 may also include an evaluation engine 100 for evaluating information continued in customer database 98 for determining a credit evaluation of the customer. For example, evaluation engine 100 may be used to evaluate various credit options available to the customer for purchasing a desired product. Evaluation engine 100 may also generate a credit evaluation report 102 containing results of the credit evaluation. The credit evaluation report 102 may be transmitted to monitoring agent 82, interface agent 80 and/or the customer via communication network 14 or other suitable communication avenues. Credit agent 84 may also update credit data 38 using information contained in credit evaluation report 102.

In operation, a customer may access processing server 16 via communication network 14 to configure a desired product offered by an enterprise using configure routine 20. Configure routine 20 may be initiated in response to receiving a prompt from the customer indicating that the customer desires to configure a desired product. Configure routine 20 accesses product database 22 and displays the various products, product options, and corresponding prices offered by the enterprise using configure screens 32. The customer may also create a user profile using profile routine 42 and corresponding profile screens 44 so that configured products may be saved for future reference and access by the customer.

The customer may also request evaluation services from the enterprise for evaluating the desired product. For example, in response to receiving an evaluation service request prompt from the customer, evaluation routine 70 may be initiated to access interface agent database 68 for displaying available interface agents 80 for providing the customer with the requested evaluation services. In response to receiving a selected interface agent 80, evaluation routine 70 may also display appointment schedule screens 72 to the customer for receiving a selected appointment schedule for evaluating the desired product. In response to receiving a selected interface agent 80 and a selected appointment schedule, evaluation routine 70 transmits information to the selected interface agent 80 corresponding to the customer requested services, such as customer data 36, configured product data 54, and the selected appointment schedule. However, other relevant information may also be transmitted to the selected interface agent 80 for providing the customer requested services. Evaluation routine 70 may also transmit information associated with the customer requested services to monitoring agent 82 so that monitoring agent 82 may track and monitor the services provided by the interface agent 80 to the customer.

The customer may also request valuation services from the enterprise for valuating a customer provided product. In response to receiving a valuation service request prompt from the customer, valuation routine 60 may accesses interface agent database 68 and displays available interface agents 80 for providing the requested services. In response to receiving a selected interface agent 80, valuation routine 60 also displays appointment schedules screens 72 to the customer for selecting an appointment schedule for receiving the requested services from the selected interface agent 80. In response to receiving the selected interface agent 80 and the selected appointment schedule, valuation routine 60 transmits information associated with the customer requested services to the selected interface agent, such as customer data 36, valuation data 56, and the selected appointment schedule. Additionally, valuation routine 60 may transmit information associated with the customer requested services to monitoring agent 82 so that monitoring agent 82 may track and monitor the services provided to the customer by the selected interface agent 80.

The customer may also request credit services from the enterprise for determining available credit options for purchasing a desired product. In response to receiving a credit service request prompt from the customer, credit routine 46 may be initiated to display credit screens 48 to the customer for providing the requested credit services. In response to receiving the required information from the customer using credit screens 48, credit routine 46 transmits information corresponding to the customer requested credit services to credit agent 84, such as customer data 36, credit data 38 and purchase data 58. The information associated with the customer requested credit services may also be transmitted to monitoring agent 82 so that monitoring agent 82 may monitor and track the credit services provided to the customer.

If the customer requested valuation services from the enterprise, in response to inspecting and/or evaluating the customer provided product, interface agent 80 generates valuation report 88 and transmits valuation report 88 to the customer. Interface agent 80 may transmit valuation report 88 to the customer using electronic mail via communication network 14; however, other suitable methods may be used to deliver valuation report 88 to the customer. Interface agent 80 may also transmit valuation report 88 to monitoring agent 82 so that monitoring agent 82 may monitor the valuation services provided by interface agent 80. Information contained in valuation report 88 may also be used to update valuation data 58 and purchase data 58 corresponding to the value assessed to the customer provided product.

If the customer requested evaluation services from the enterprise associated with a desired product, in response to evaluation of the desired product by the customer, interface agent 80 may generate evaluation report 90 containing information associated with the evaluation of the product by the customer. Interface agent 80 may transmit evaluation report 90 to monitoring agent 82 via communication network 14 so that monitoring agent 82 may monitor the services provided by the selected interface agent 80. Evaluation report 90 may also be transmitted to the customer via communication network 14.

If the customer requested credit services, in response to evaluating credit and financing options available to the customer, evaluation engine 100 generates credit evaluation report 102 containing the results of the credit evaluation and transmits credit evaluation report 102 to the customer. Credit evaluation report 102 may also be transmitted to the selected interface agent 80 and the monitoring agent 82. Information contained in credit evaluation report 102 may be used to update credit data 38 and purchase data 58 corresponding to the resulting credit options available to the customer.

If the customer desires to purchase the desired product, in response to receiving a purchase prompt from the customer, purchase routine 64 may be initiated to access customer database 34 to retrieve relevant information associated with the purchase of the desired product and display purchase screens 66 to the customer for processing and completing the purchase of the desired product. For example, purchase routine 64 may access configured product data 54, valuation data 56, and credit data 38 to generate and display purchase data 58 to the customer.

In response to receiving a purchase request from the customer, purchase routine 64 may also initiate tracking engine 94 to order, track, and monitor the manufacture of the desired product. For example, tracking engine 94 may access manufacture database 96 to retrieve information associated with the manufacture and delivery of the desired product. Tracking engine 94 may also be used to monitor any changes occurring during production of the desired product, such as required options changes or delivery date changes, and transmit the information associated with the required changes to the customer via communication network 14. Tracking engine 94 may also transmit information associated with production changes or delivery date changes to the selected interface agent 80.

Thus, the present invention provides greater flexibility than prior systems and methods by providing a combination of online and offline customer services. For example, the present invention provides the customer with the flexibility of performing various transactions related to the purchase of a desired product online while providing the customer with offline services as requested by the customer. Therefore, the present invention offers increased flexibility by providing a variety of services to the customer in a convenient and efficient package.

FIG. 2 is a flow chart illustrating a method for configuring a desired product in accordance with an embodiment of the present invention. The method begins at step 200 where processing server 16 displays one or more web pages 18 to the customer so that the customer may access the various services offered by the enterprise. At step 202, a determination is made whether the customer has previously created a user profile with the enterprise. If the customer has not previously created a user profile, the customer may opt to create a user profile so that the customer may configure and store various products. If the customer desires to create a user profile, the method proceeds to step 204 where profile routine 42 displays one or more profile screens 44 to the customer for receiving information associated with creating a user profile. At step 206, the customer profile is generated based on the information received from the customer and is stored as customer data 36. If the customer has previously created a user profile, the method proceeds from step 202 to step 208, where customer data 36 may be accessed to retrieve information associated with the customer.

At step 210, a determination is made whether the customer desires to configure a product. If the customer desires to configure a product, the method proceeds to step 212, where configure routine 20 is initiated and one or more configure screens 32 are displayed to the customer for configuring a desired product. At step 214, information associated with the desired product is stored as configured product data 54. If the customer does not desire to configure a product, the method proceeds from step 210 to step 216, where a determination is made whether the customer desires to display saved configured products. If the customer does not desire to display previously configured and saved products, the method returns to step 200, where the customer may access other services provided by the enterprise. If the customer desires to display previously configured and saved products, the method proceeds from step 216 to step 218.

At step 218, configured product data 54 is displayed to the customer for a particular configured product selected by the customer. For example, one or more web pages 18 may be displayed to the customer containing a summary of each saved product using configured product data 54. In response to a selected product, more detailed information associated with the saved product may be displayed to the customer using configured product data 54.

At step 220, a determination is made whether modification to the selected product is requested by the customer or required by the enterprise. For example, one or more options selected by the customer when configuring the product may be unavailable, thereby requiring modification of the configured product. Thus, information contained in product database 22 may be linked to information contained in customer database 34 to reflect modifications and/or updates in the corresponding information. If modification of the configured product is requested or required, the method proceeds to step 222, where configure routine 20 displays configure screens 32 for reconfiguring the selected product. At step 224, configured product data 54 is updated to correspond with the selected modifications to the desired product. If no modifications to the selected product are requested by the customer or required by the enterprise, the method proceeds from step 220 to step 226.

At step 226, a determination is made whether the customer desires to purchase the selected product. If the customer does not desire to purchase the product, the method returns to step 200 where one or more web pages 18 may be displayed to the customer for selecting other services provided by the enterprise. If the customer desires to purchase the selected product, the method proceeds from step 226 to step 228, where purchase routine 64 may retrieve purchase data 58 and display one or more purchase screens 66 to the customer for completing the purchase transaction. For example, purchase routine 64 may access configured product data 54, price data 30, credit data 38 and other suitable information associated with processing the purchase of the product. At step 230, purchase routine 64 may display a web page 18 containing options for selecting other services offered by the enterprise, such as credit services, warranty options, and insurance options associated with the purchase of the desired product.

At step 232, a determination is made whether additional services are requested by the customer. If additional services are requested by the customer, the method, proceeds to step 234, where corresponding web pages 18 are displayed to the customer corresponding to the requested services. At step 236, information contained in purchase data 58 may be updated to reflect any additional services requested by the customer, such as updates to credit data 38 in response to receiving credit services offered by the enterprise. After purchase data 58 is updated, the method proceeds to step 238. If no additional services are requested by the customer at step 232, the method proceeds directly from step 232 to step 238, where a determination is made whether the customer is prepared to "check-out" or finalize the purchase of the desired product. If the customer is not prepared to "check-out," the method returns to step 200, where one or more web pages 18 may be displayed to customer for selection of other services provided by the enterprise. If the customer is prepared to complete the purchase transaction, the method proceeds from step 238 to step 240, where purchase routine 64 displays purchase data 58 for the desired product.

At step 242, purchase routine 64 displays one or more delivery screens 104 to the customer for requesting a particular delivery location for the desired product. For example, the customer may have the option of selecting a particular interface agent 80 for taking delivery of the desired product or selecting other suitable delivery locations. At step 244, purchase routine 64 receives the selected delivery location from the customer and, at step 246, a determination is made whether the customer requests delivery of the desired product to an interface agent 80.

If the customer requests delivery to an interface agent 80, purchase routine 64 accesses interface agent database 68 and displays available interface agents 80 for providing delivery of the desired product to the customer at step 248. At step 250, purchase routine 64 receives the selected interface agent 80 and updates purchase data 58 corresponding to the selected delivery location. If the customer requests delivery of the desired product to a location other than an interface agent 80, the method proceeds from step 246 to step 252, where purchase routine 64 receives the selected delivery location and updates purchase data 58 to correspond with the selected delivery location. At step 254, purchase routine 64 may display a delivery screen 104 to the customer requesting confirmation of the selected delivery location. At step 256, a determination is made whether modification to the delivery location is required. If modification to the delivery location is required, the method returns to step 242. If modification to the delivery location is not required, the method proceeds to step 258.

At step 258, purchase routine 64 displays one or more purchase screens 66 to the customer containing information associated with various payment methods that may be used by the customer to purchase the desired product. At step 260, purchase routine 64 receives the selected payment method from the customer and assigns an order identifier to the desired product at step 262. The order identifier may be used to order the desired product and track the desired product through production and delivery. Purchase routine 64 also updates purchase data 58 corresponding to the order identifier. At step 264, purchase routine 64 transmits purchase data 58 to monitoring agent 82 so that monitoring agent 82 may process the order and begin production of the desired product. At step 266, purchase routine 64 transmits purchase data 58 to credit agent 84 so that credit agent 82 may initiate services associated with the purchase of the desired product. For example, at step 268, credit agent 84 assigns an account identifier corresponding to the customer for performing activities such as initiating account receivable tracking procedures corresponding to the purchase of the product. Credit agent 84 may also transmit the account identifier to monitoring agent 82 so that monitoring agent 82 may monitor the monetary exchange between the customer and the enterprise for purchasing the desired product. At step 270, purchase routine 64 also transmits purchase data 58 to the selected interface agent 80 so that the selected interface agent may provide the required services to the customer, such as delivering the product to the customer.

At step 272, monitoring agent 82 transmits a visit request to the customer to confirm purchase data 58. For example, monitoring agent may transmit the visit request using electronic mail to the customer requesting that the customer arrange a meeting with the selected interface agent 80 for executing various sales agreements corresponding to the purchase of the product. In response to receiving confirmation of purchase data 58 from the customer by interface agent 80, interface agent 80 may update purchase data 58 to include any modifications to purchase data 58 requested by the customer at step 274. Interface agent 80 may also update customer data 36 based on information received from the customer. At step 276, interface agent 80 transmits the updated purchase data 68 and customer data 36 to monitoring agent 82.

At step 278, monitoring agent 82 may activate tracking engine 94 to verify availability of the desired product. At step 280, a determination is made whether modification to the desired product is required based on current manufacturing constraints. For example, various selected options or option packages associated with the desired product may no longer be available. If product modification is required, the method proceeds from step 280 to step 282, where configured product data 54 and purchase data 58 is updated to reflect the required modifications. In step 284, the updated configured product data 40 and purchase data 58 is transmitted to the customer. If no modification to the desired product is required, the method proceeds from step 280 to step 286, where monitoring agent 82 initiates tracking engine 94 to access manufacture database 96 for obtaining an estimated delivery schedule for the desired product. Additionally, monitoring agent 82 may poll the selected interface agent 80 for information associated with the estimated delivery schedule of the desired product. For example, the customer may have selected various options for the desired product that require installation by the selected interface agent 80, thereby requiring additional preparation time prior to delivery of the product to the customer.

At step 288, monitoring agent 82 updates purchase data 58 corresponding to the estimated delivery schedule of the desired product. Monitoring agent 82 then transmits the estimated delivery schedule to the selected interface agent 80 at step 290. At step 292, the estimated delivery schedule is also transmitted to the customer. The estimated delivery schedule may be automatically transmitted to the customer via communication network 14 using electronic mail from the selected interface agent 80 or may be automatically transmitted to the customer from monitoring agent 82. However, other suitable methods and devices may be used for transmitting the estimated delivery schedule to the customer.

At step 294, tracking engine 94 is used to monitor production and delivery of the desired product. At step 296, a determination is made whether modification to the estimated delivery schedule is required. If modification to the estimated delivery schedule is required, the method returns to step 288. If modification of the estimated delivery schedule is not required, the method proceeds from step 296 to step 298, where a delivery notice may be received by monitoring agent 82 indicating that the desired product has reached an interim delivery location. For example, if the product is manufactured overseas, the delivery notice may indicate to monitoring agent 82 that the desired product has reached an interim delivery location, such as an import holding area, prior to transfer of the desired product to the interface agent 80. At step 300, monitoring agent transmits the delivery notice to the customer and the selected interface agent 80.

At step 302, monitoring agent 82 updates the delivery notice to correspond to changes in the location of the desired product and transmits the changes to the customer and the interface agent 80. For example, monitoring agent 82 may receive a message from the import area that the desired product has departed the import holding area and is in transit to the interface agent 80. Monitoring agent 82 updates the delivery notice and transmits the updated information to the customer and the interface agent 80.

At step 304, the selected interface agent 80 transmits a product received notice to monitoring agent 82 indicating that the interface agent 80 has received the desired product. At step 306, interface agent 80 confirms the delivery schedule for the desired product to the customer. For example, updates to the delivery schedule may be required based on modifying the desired product in accordance with the customer selected options or due to unforeseen circumstances occurring during transport of the desired product. At step 308, monitoring agent 82 transmits the confirmed delivery schedule to the customer.

At step 310, credit agent 84 receives payment for the desired product from the customer or from another party, such a lending institution. At step 312 credit agent 84 updates purchase data 58 reflecting that payment for the desired product has been received and transmits the updated purchase data 58 to monitoring agent 82. At step 314, credit agent 84 transmits product registration information to the selected interface agent 80 for registration of the product to the customer. At step 316, the selected interface agent 80 registers the product to the customer and transmits corresponding registration information to the customer.

At step at step 318, the selected interface agent 80 receives information and documents from the customer required for delivery of the product to the customer, such as documents requiring a signature of the customer for transferring ownership of the product to the customer. At step 320, interface agent 80 delivers the product to the customer and transmits the customer documents and information to the monitoring agent 82 at step 322.

At step 324, monitoring agent 82 updates purchase data 58 to reflect delivery of the product to the customer and transmits relevant customer documents and information to credit agent 84. At step 326, monitoring agent 82 transmits payment to the selected interface agent 80 as compensation for the services provided by the selected interface agent 80. At step 328, monitoring agent 82 transmits a customer satisfaction survey to the customer for receiving customer input regarding the purchasing transaction.

Figure 3:
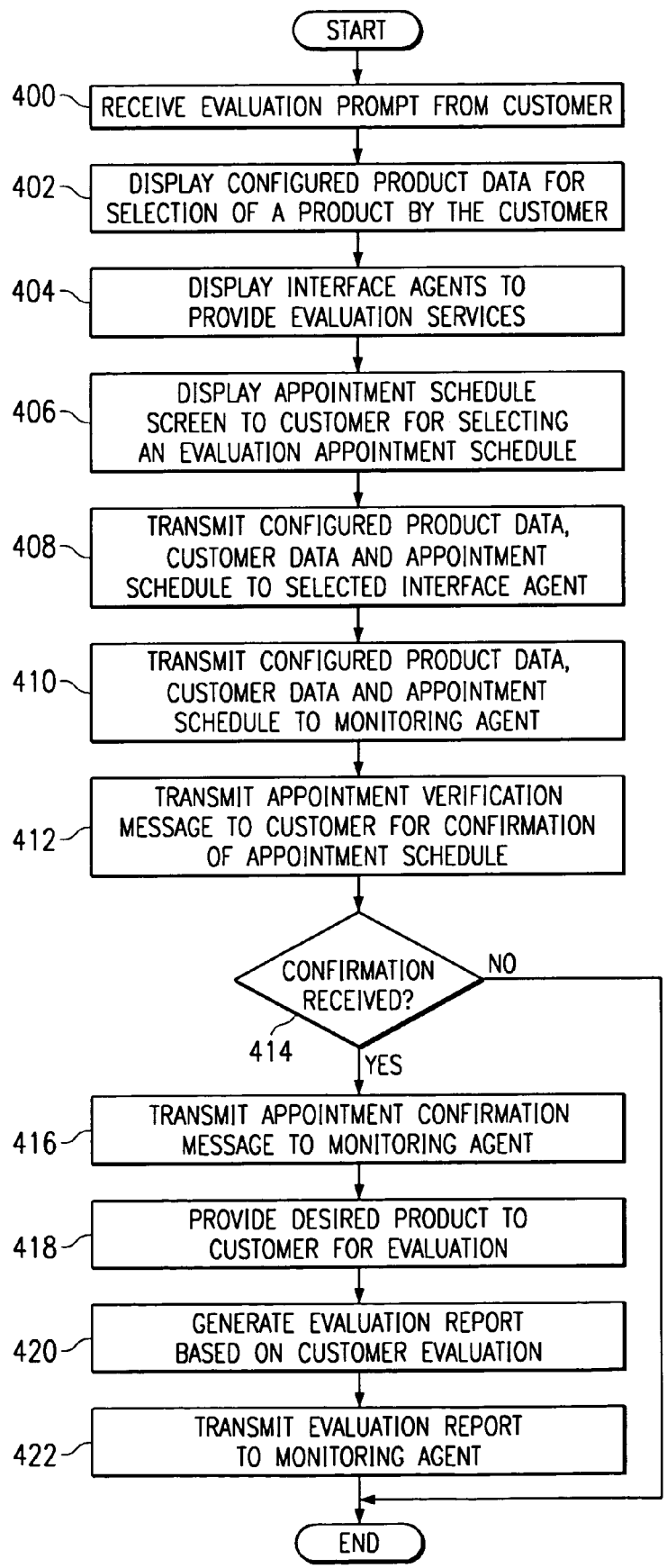
FIG. 3 is a flow chart of a method for customer product evaluation in accordance with an embodiment of the present invention.

FIG. 3 is a flow chart illustrating a method for providing customer evaluation services for a desired product in accordance with an embodiment of the present invention. The method begins at step 400, where processing server 16 receives an evaluation prompt from the customer indicating that the customer requests evaluation services corresponding to a desired product. In response to receiving the evaluation services prompt from the customer, evaluation routine 70 accesses configured product data 54 and displays the products configured by the customer so that the customer may select the products the customer desires to evaluate at step 402.

At step 404, evaluation routine 70 accesses interface agent database 68 and displays available interface agents 80 for providing the customer requested evaluation services. At step 406, in response to receiving a selected interface agent 80, evaluation routine 70 displays an appointment schedule screen 72 to the customer for receiving an appointment schedule to receive the requested evaluation services from the selected interface agent 80.

At step 408, in response to receiving a selected appointment schedule, evaluation routine 70 transmits customer data 36, configured product data 54, and the selected appointment schedule to the selected interface agent 80. At step 410, evaluation routine 70 also transmits customer data 36, configured product data 54, the selected appointment schedule, and the selected interface agent 80 to monitoring agent 82.

At step 412, the selected interface agent 80 transmits to the customer an appointment verification message requesting confirmation of the selected appointment schedule. At step 414, a determination is made whether confirmation of the selected appointment schedule is received from the customer. If confirmation of the selected appointment schedule is not received from the customer, monitoring agent 80 may request additional confirmation messages to be sent to the customer or may contact the customer directly to confirm the requested services. If confirmation of the selected appointment schedule is still not received from the customer, the method ends. If confirmation of the selected appointment schedule is received from the customer at step 414, the method proceeds to step 416, where the selected interface agent 80 transmits an appointment confirmation message to monitoring agent 82 indicating that the customer has confirmed the selected appointment schedule for receiving the requested evaluation services.

At step 418, the selected interface agent 80 provides the desired product, or a product similar to the desired product, to the customer for evaluation. In response to the customer evaluation of the product, interface agent 80 generates evaluation report 90 based on information provided by the customer for the evaluated product at step 420. At step 422, interface agent 80 transmit the evaluation report 90 to the monitoring agent 82.

Figure 4:
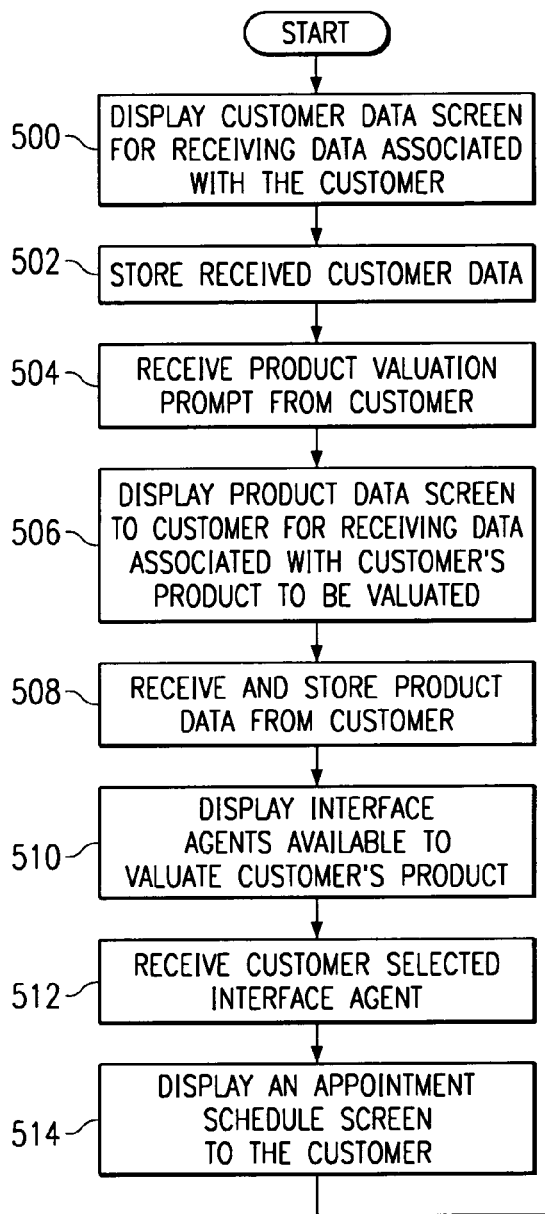
FIG. 4 is a flow chart of a method for customer product valuation in accordance with an embodiment of the present invention.
Figure 4:
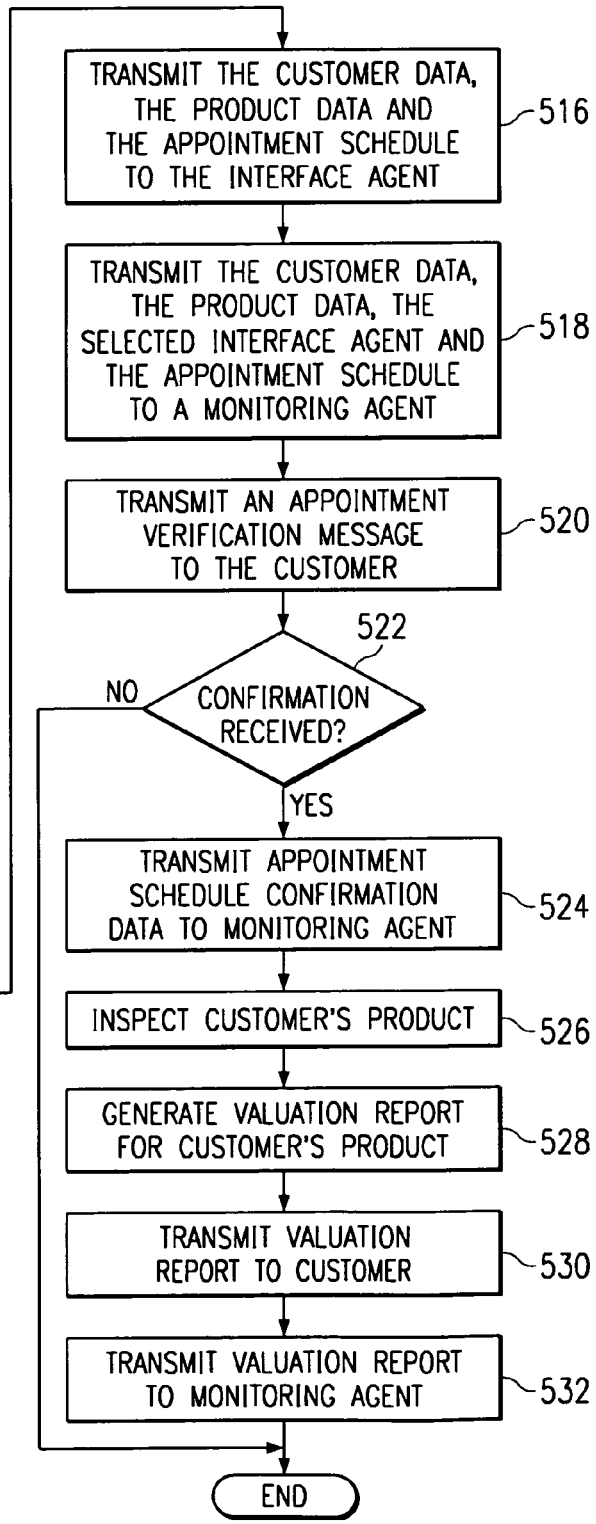

FIG. 4 is a flow chart illustrating a method for providing customer valuation services in accordance with an embodiment of the present invention. The method begins at step 500 where profile routine 44 displays one or more profile screens 44 to the customer for receiving information associated with identifying the customer. At step 502 the information received from the customer is stored as customer data 36. At step 504, processing server 16 receives a prompt from the customer indicating that the customer requests valuation services associated with a customer provided product that may be used by the customer to offset a purchase price of a desired product.

At step 506, in response to receiving the valuation services prompt from the customer, valuation routine 60 displays one or more valuation screens 62 to the customer for receiving information associated with the customer's product. At step 508, the received information associated with the customers product is stored as valuation data 56. In response to receiving and storing valuation data 56, valuation routine 60 accesses interface agent database 68 and displays available interface agents 80 for valuating the customer's product at step 510. Valuation routine 60 may also access customer data 36 to retrieve information associated with the geographical location or region of the customer and display available interface agents 80 corresponding to the same region or location as the customer.

At step 512, in response to receiving a selected interface agent 80 from the customer, valuation routine 60 displays an appointment schedule screen 72 to the customer for selection of a desired appointment schedule by the customer for receiving the requested valuation services. At step 516, in response to receiving a selected appointment schedule from the customer, valuation routine 60 transmits customer data 36, valuation data 56, and the selected appointment schedule to the selected interface agent 80. At step 518, valuation routine 60 also transmits customer data 36, valuation data 56, the selected appointment schedule and the selected interface agent 80 to monitoring agent 82.

At step 520, the selected interface agent 80 transmits an appointment verification message to the customer requesting confirmation of the selected appointment schedule for receiving the requested valuation services. At step 522, a determination is made whether the customer has confirmed the selected appointment schedule. If confirmation of the selected appointment schedule is not received from the customer, monitoring agent 80 may request additional confirmation messages be sent to the customer or may contact the customer directly to confirm the requested services. If confirmation of the selected appointment schedule is still not received from the customer, the method ends. If confirmation of the selected appointment schedule is confirmed by the customer, the method proceeds to step 524, where the selected interface agent 80 transmits an appointment schedule confirmation message to monitoring agent 82 indicating that the customer has confirmed the selected appointment schedule for receiving the requested valuation services.

At step 526, the selected interface agent 80 inspects or otherwise evaluates the customer provided product. At step 528, the selected interface agent 80 generates valuation report 88 for the customer provided product containing the results of the interface agent 80 inspection, such as a valuation of the customer provided product. At step 530, interface agent 80 transmits the valuation report to the customer. At step 532, the interface agent 80 also transmits the valuation report 88 to the monitoring agent 82. As described above, information contained in valuation report 88 may be used to update valuation data 56 to reflect the valuation assigned to the customer provided product by the interface agent 80.

Figure 5:
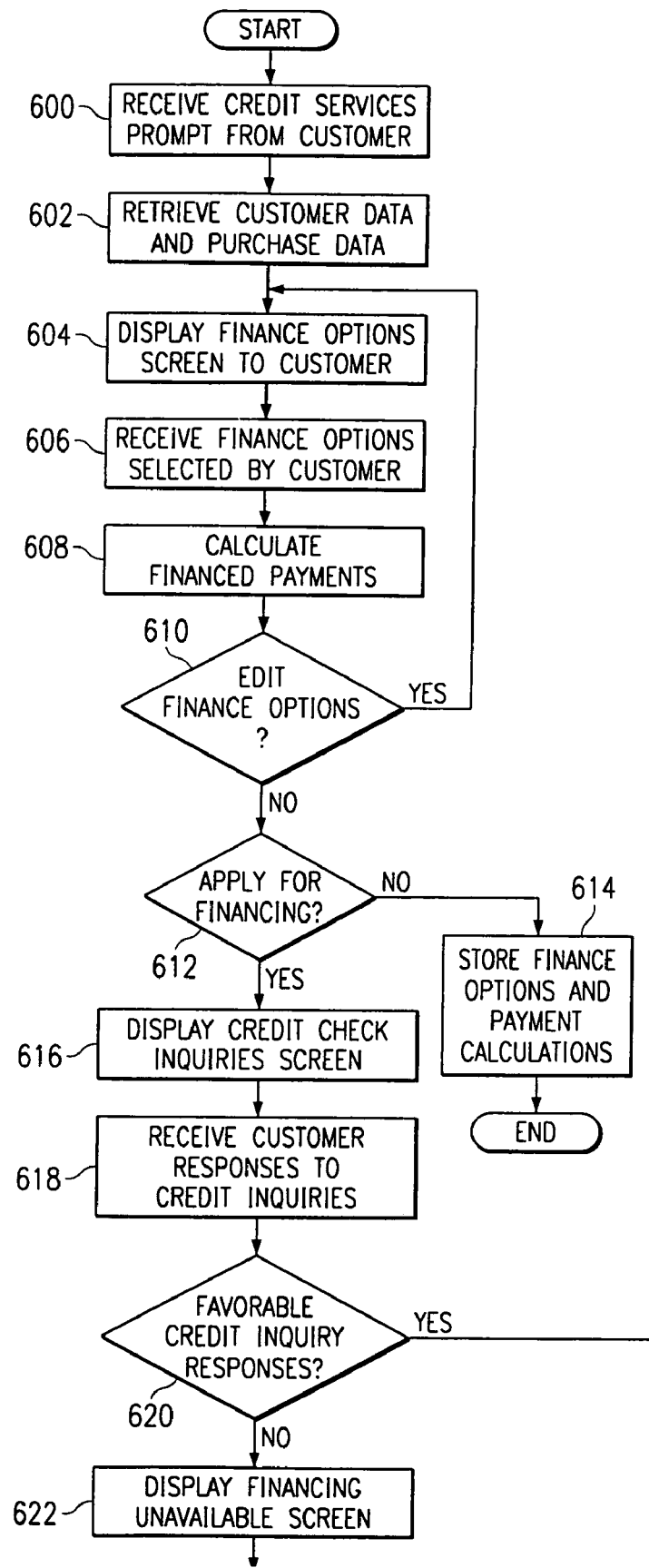
FIG. 5 is a flow chart of a method for customer credit processing in accordance with an embodiment of the present invention.
Figure 5:
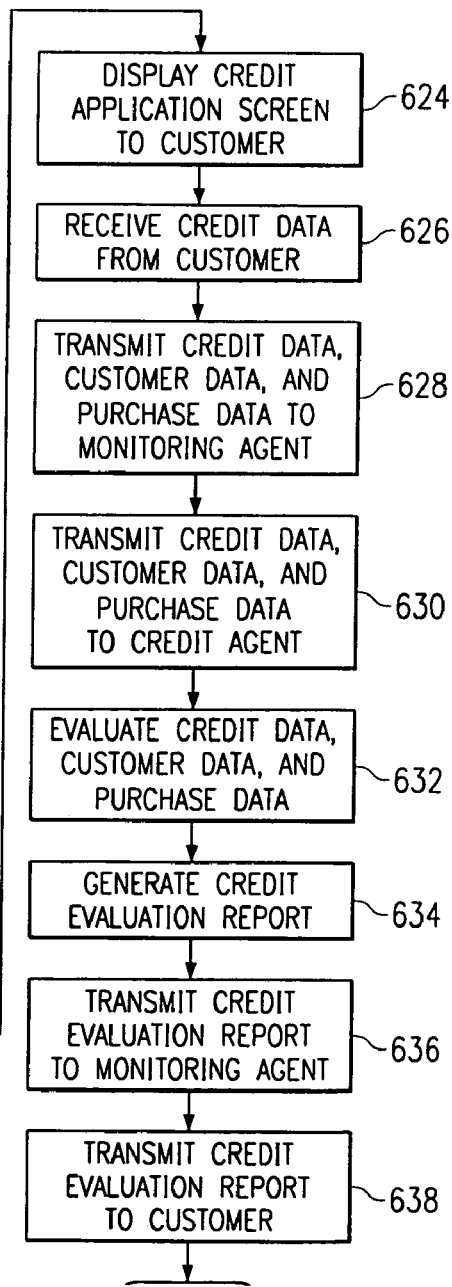

FIG. 5 is a flow chart illustrating a method for providing credit services to a customer in accordance with an embodiment of the present invention. The method begins at step 600 where processing server 16 receives a credit services prompt from the customer indicating that the customer requests credit services from the enterprise. At step 602, credit routine 46 accesses customer database 34 to retrieve information associated with the customer, such as customer data 36 and purchase data 58. At step 604, credit routine 46 displays one or more credit screens 48 to the customer for selecting various credit or finance options for selection by the customer, such as finance term, down payment information, and/or finance rates. At step 606, credit routine 46 receives the selected credit options from the customer and, at step 608, provides calculation information to the customer based on the customer provided information, such as a monthly payment for the desired product based on the term, finance rate and down payment provided by the customer.

At step 610, a determination is made whether the customer desires to modify the previously selected finance options. If the customer desires to modify the requested finance options, the method returns to step 604. If the customer does not desire to modify the selected finance options, the method proceeds to step 612, where a determination is made whether the customer desires to apply for financing using the online credit services provided by the enterprise.

If the customer does not desire to apply for financing using the credit services provided by the enterprise, the method proceeds to step 614, where credit routine 46 may store the finance options and payment calculations previously displayed and selected by the customer as credit data 38. If the customer desires to apply for financing using the enterprise provided credit services, the method proceeds to 616, where credit routine 46 displays credit check inquiry screen 50 to the customer.

At step 618, credit routine 46 receives customer responses to the credit inquiries contained on credit inquiry screen 50. At step 620, a determination is made whether the responses to the credit inquiries meet or exceed predetermined standards for providing the customer with additional credit resources. If the responses received from the customer do not meet or exceed the predetermined standards, the method proceeds to step 622, where credit routine 46 may display a credit screen 48 indicating that additional financing resources are unavailable to the customer. If the responses to the credit inquiries meet or exceed the predetermined standards, the method proceeds to step 624, where credit routine 46 displays credit application screen 52 to the customer.

At step 626, credit routine 46 receives information from the customer corresponding to the credit application screens 52 and stores the provided information as credit data 38. At step 628, credit routine 46 transmits credit data 38, customer data 36, and purchase data 58 to monitoring agent 82. At step 630, credit data 38, customer data 36, and purchase date 58 is transmitted to credit agent 84 for credit evaluation.

At step 632, evaluation engine 100 is used to evaluate the information provided by the customer corresponding to the requested credit services, such as credit data 38, customer data 36, and purchase data 58. At step 634, evaluation engine 100 generates credit evaluation report 102 containing the results of the credit evaluation. At step 636, evaluation engine 100 transmits credit evaluation report 102 to monitoring agent 82. At step 638, credit evaluation report 102 is transmitted to the customer. Credit evaluation report 102 may be transmitted to the customer from monitoring agent 82, such as by electronic mail using communication network 14, or may be automatically transmitted to the customer from credit agent 84.

Figure 6:
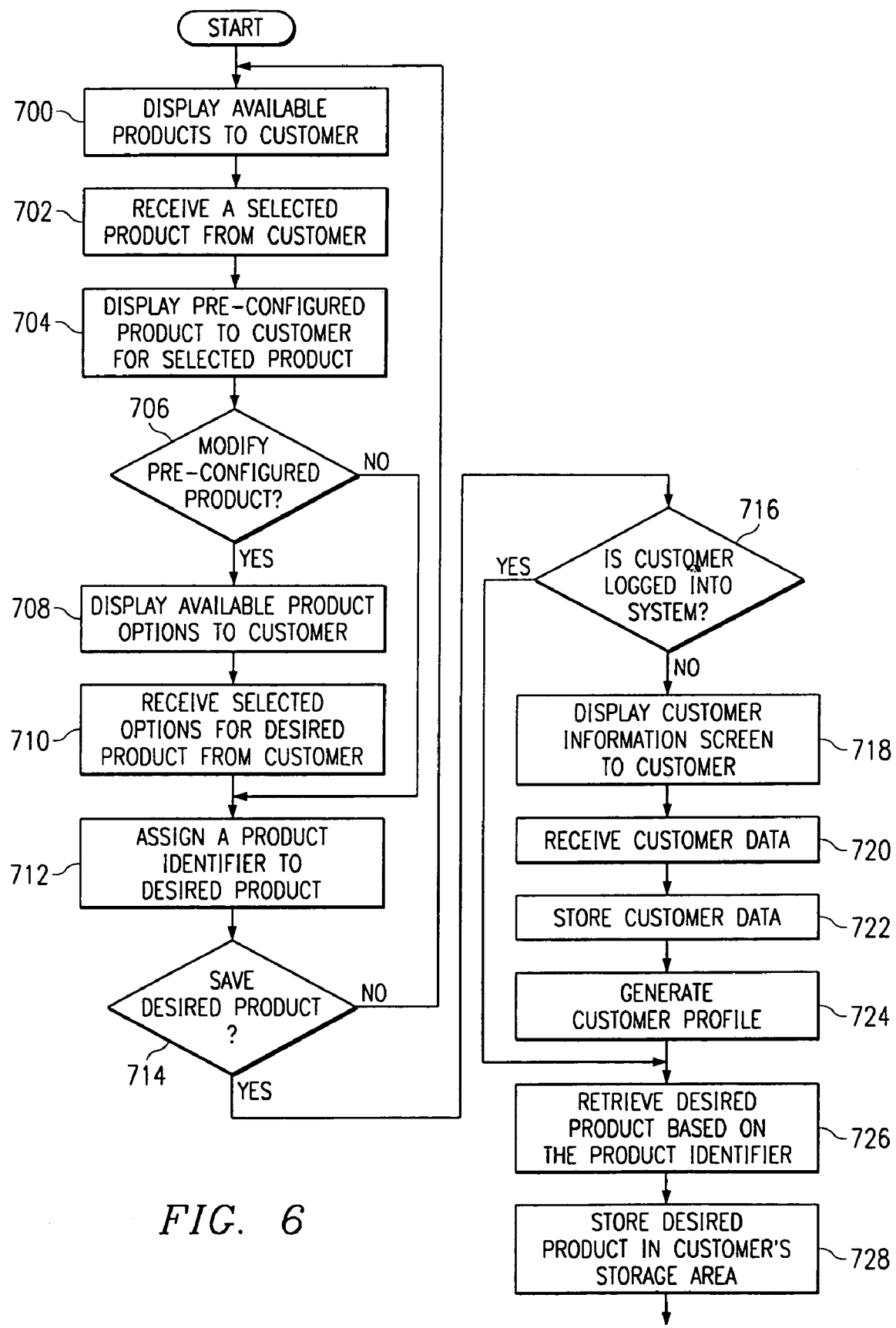
FIG. 6 is a flow chart of a method for online product configuration processing in accordance with an embodiment of the present invention.

FIG. 6 is a flow chart illustrating a method for providing product configuration services to a customer in accordance with an embodiment of the present invention. The method begins at step 700, where configure routine 20 displays one or more configure screens 32 to the customer containing information contained in product database 22 associated with the various products available to the customer by the enterprise, such as make data 24 and model data 26. At step 702, configure routine 20 receives a selected product from the customer and, at step 704, displays a preconfigured product based on the customer selected product. Configure routine 20 may also access price data 30 for displaying the cost of the selected product to the customer.

At step 706, a determination is made whether the customer desires to modify the preconfigured product. If the customer desires to modify the preconfigured product, the method proceeds to step 708, where configure routine 20 accesses option data 28 and displays one or more configure screens 32 containing information associated with various options and/or option packages available for the customer selected product. At step 710, configure routine 20 receives the selected options and option packages desired by the customer and accesses price data 30 for displaying the associated costs for the selected options. If the customer does not desire to modify the preconfigured product at step 706, the method proceeds directly from step 706 to step 712.

At step 712, configure routine 20 assigns a product identifier to the configured product so that the configured product may be retrieved for subsequent reference. At step 714, a determination is made whether the customer desires to save the configured product for future retrieval. If the customer does not desire to save the configured product, the method returns to step 700. If the customer desires to save the configured product, the method proceeds to step 716, where a determination is made whether the customer has previously created a user profile.

If the customer has not previously created a user profile, the method proceeds from step 716 to 718, where profile routine 42 displays one or more profile screens 44 to the customer for creating a user profile for the customer. At step 720, profile routine 42 receives the requested information from the customer associated with profile screens 44 and, at step 722, stores the received information as customer data 36. At step 724, profile routine 42 generates the customer profile based on the information contained in customer data 36. If the customer has previously created a user profile, the method proceeds from step 716 directly to step 726.

At step 726, configure routine 20 retrieves information associated with the configured product based on the product identifier assigned at step 712. At step 728, configure routine 20 stores information associated with the desired configured product as configured product data 54.

Although the present invention and its advantages have been described in detail, it should be understood that various changes, substitutions, and alterations can be made therein without departing from the spirit and scope of the present invention as defined by the appended claims.

What is claimed is:

1. A method for providing product evaluation services, comprising:
   storing data associated with a customer in a customer database;
   displaying available product options to the customer for a desired product;
   in response to receiving a customer selected product and product options, storing data associated with the desired product in the customer database;
   selecting available interface agents for evaluation of the desired product based on the customer data;
   displaying the selected available interface agents for evaluation of the desired product by the customer;
   receiving a customer-selected interface agent, the customer-selected interface agent being one of the displayed available interface agents;
   in response to receiving the customer-selected interface agent, displaying an appointment schedule screen to the customer for selecting an appointment schedule for interacting with the customer-selected interface agent to evaluate the desired product; and
   in response to receiving a selected appointment schedule, transmitting the desired product data, the customer data, and the selected appointment schedule to the customer-selected interface agent.

2. The method of claim 1, further comprising transmitting the desired product data, the customer data, and the selected appointment schedule to a monitoring agent.

3. The method of claim 1, further comprising transmitting an appointment schedule verification request to the customer via electronic mail requesting confirmation of the selected appointment schedule.

4. The method of claim 3, wherein transmitting the appointment schedule verification request comprises transmitting from the customer-selected interface agent to the customer the appointment schedule verification request via electronic mail.

5. The method of claim 3, further comprising:
   receiving confirmation of the appointment schedule from the customer; and
   transmitting an appointment schedule confirmation message to the monitoring agent.

6. The method of claim 1, further comprising:
   transmitting the desired product data, the customer data, and the selected appointment schedule to a monitoring agent;
   transmitting an appointment verification message to the customer via electronic mail requesting confirmation of the selected appointment schedule; and
   in response to receiving confirmation of the selected appointment schedule from the customer, transmitting an appointment confirmation message to the monitoring agent.

7. The method of claim 6, further comprising:
   in response to an evaluation of the desired product by the customer, generating an evaluation report based on the customer evaluation; and
   transmitting the evaluation report to the monitoring agent.

8. The method of claim 7, further comprising updating the product data based on information contained in the evaluation report.

9. The method of claim 1, wherein displaying available interface agents comprises:
   retrieving a location of the customer from the customer data;

accessing an interface agent database; and displaying the interface agents proximate to the location of the customer.

10. A method for providing product valuation services, comprising:

storing data associated with a customer in a customer database;

displaying a valuation screen to the customer containing entry fields for receiving valuation data corresponding to a customer provided product;

in response to receiving the valuation data from the customer, selecting one or more available interface agents for valuating the product based on the customer data;

displaying the selected available interface agents for valuating the product;

receiving a customer-selected interface agent, the customer-selected interface agent being one of the displayed available interface agents;

in response to receiving the customer-selected interface agent, displaying an appointment schedule screen to the customer for selecting an appointment schedule with the customer-selected interface agent for receiving the valuation services from the customer-selected interface agent; and in response to receiving a selected appointment schedule, transmitting the customer data, the valuation data and the selected appointment schedule to the customer-selected interface agent for valuating the product.

11. The method of claim 10, further comprising transmitting the customer data, the valuation data and the selected appointment schedule to a monitoring agent.

12. The method of claim 11, wherein transmitting to the monitoring agent comprises transmitting, via electronic mail, the customer data, the valuation data and the appointment schedule from the customer-selected interface agent to the monitoring agent.

13. The method of claim 10, further comprising:

receiving the product from the customer;

valuating the product; and generating a valuation report for the product.

14. The method of claim 13, further comprising:

transmitting the valuation report to the customer; and transmitting the valuation report to a monitoring agent.

15. The method of claim 13, further comprising updating the valuation data using information contained in the valuation report.

16. The method of claim 10, further comprising:

transmitting an appointment verification request to the customer; and in response to receiving confirmation of the selected appointment schedule from the customer, transmitting an appointment confirmation message to a monitoring agent.

17. The method of claim 16, wherein transmitting the appointment verification request comprises transmitting from the customer-selected interface agent to the customer the appointment verification request via electronic mail.

18. The method of claim 17, wherein transmitting the appointment confirmation message comprises transmitting from the customer-selected interface agent to the monitoring agent the appointment confirmation message via electronic mail.

19. An Internet customer service system, comprising:

a product database storing available product data for products available to a customer;

an interface agent database storing available interface agents for interacting with the customer;

a server operable to:

access the product database;

display the product data to the customer through interface web pages;

access the interface agent database;

select available interface agents;

display the selected available interface agents to the customer through the web pages; and receive at least one customer-selected interface agent, the at least one customer-selected interface agent being one of the displayed available interface agents; and a customer database storing customer data generated in response to displaying one or more profile screens to the customer via the web pages, the customer database further storing configured product data generated in response to receiving selected product data from the customer via the web pages; and wherein the server is operable to transmit, in response to receiving the at least one customer-selected interface agent and an appointment schedule from the customer, the customer data, the configured product data, and the appointment schedule to the at least one customer-selected interface agent.

20. The system of claim 19, wherein the product database further comprises price data associated with the products available to the customer.

21. The system of claim 19, wherein the server is further operable to transmit the customer data, the configured product data, and the appointment schedule to a monitoring agent.

22. The system of claim 19, further comprising a valuation routine operable to receive valuation data from the customer, the valuation data associated with a product provided by the customer, and wherein the server is further operable to transmit the valuation data to the at least one customer-selected interface agent.

23. The system of claim 22, wherein the server is further operable to transmit the valuation data to a monitoring agent.

24. The system of claim 19, further comprising a credit routine operable to receive credit data from the customer, the credit data associated with financing a purchase of the selected product by the customer.

25. The system of claim 24, wherein the server is further operable to transmit the credit data to a credit agent for evaluation.

26. The system of claim 25, wherein the server is further operable to transmit the credit data to a monitoring agent.

27. The system of claim 19, wherein the server is further operable to generate valuation data associated with a value of a customer provided product, the web server further operable to generate purchase data using the configured product data and the valuation data.

28. The system of claim 27, wherein the server is further operable to transmit the purchase data to a monitoring agent.

29. The system of claim 27, further comprising a credit routine operable to receive credit data from the customer, the credit data associated with financing a purchase of the selected product by the customer, and wherein the server is further operable to transmit the credit data and the purchase data to a credit agent.

30. The system of claim 29, further comprising an evaluation engine operable to generate a credit evaluation report based on the credit data and the purchase data.

31. The system of claim 30, wherein the evaluation engine is further operable to transmit the credit evaluation report to the customer.

32. The system of claim 31, wherein the evaluation engine is further operable to transmit the credit evaluation report to a monitoring agent.

33. An Internet customer service system, comprising:
- a product database storing product option data for products available to a customer;
- a web server operable to access the product database and display the product option data to the customer through interface web pages;
- a configure routine operable to generate configured product data in response to receiving selected product option data from the customer via the web pages;
- a customer database storing the configured product data;
- a credit routine operable to:
  - receive responses from the customer through one or more credit screen web pages;
  - receive at least a portion of the configured product data generated by the configure routine; and
  - generate credit data in response to receiving the responses from the customer through the one or more credit screen web pages and receiving the portion of the configured product data generated by the configure routine; and
- wherein the web server is further operable to transmit the customer data and the credit data to a credit agent for credit evaluation.

34. The system of claim 33, wherein the web server is further operable to transmit the credit data and the configured product data to a monitoring agent.

35. The system of claim 33, further comprising a valuation routine operable to generate valuation data in response to receiving from the customer, via the web pages, data associated with a customer provided product.

36. The system of claim 35, wherein the web server is further operable to transmit the valuation data to the credit agent.

37. The system of claim 33, further comprising an evaluation engine operable to evaluate the credit data and generate a credit evaluation report.

38. The system of claim 37, wherein the evaluation engine agent is operable to transmit the credit evaluation report to the customer.

39. The system of claim 37, wherein the evaluation engine agent is operable to transmit the credit evaluation report to a monitoring agent.

40. The system of claim 33, wherein the web server is operable to display a credit inquiry screen web page to the customer, and wherein the web server is further operable to display a credit application screen web page to the customer based on responses received from the customer using the credit inquiry screen web page.

* * * * *